Feb. 14, 1956  G. C. COOK  2,734,759
COMBINATION OIL RETAINER AND DUST GUARD
Filed Sept. 8, 1953
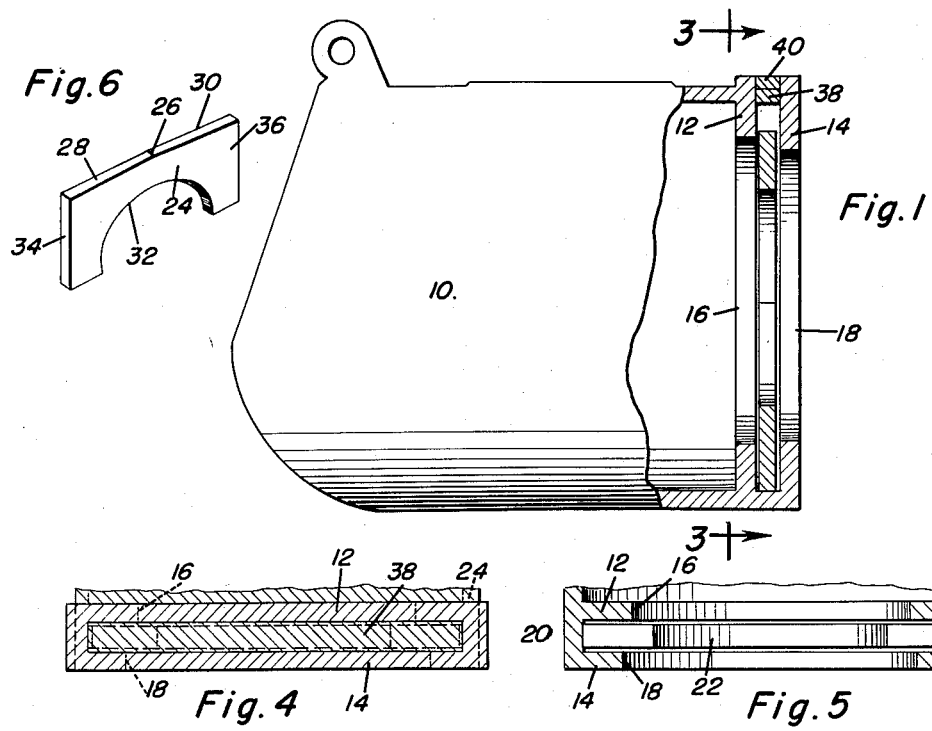
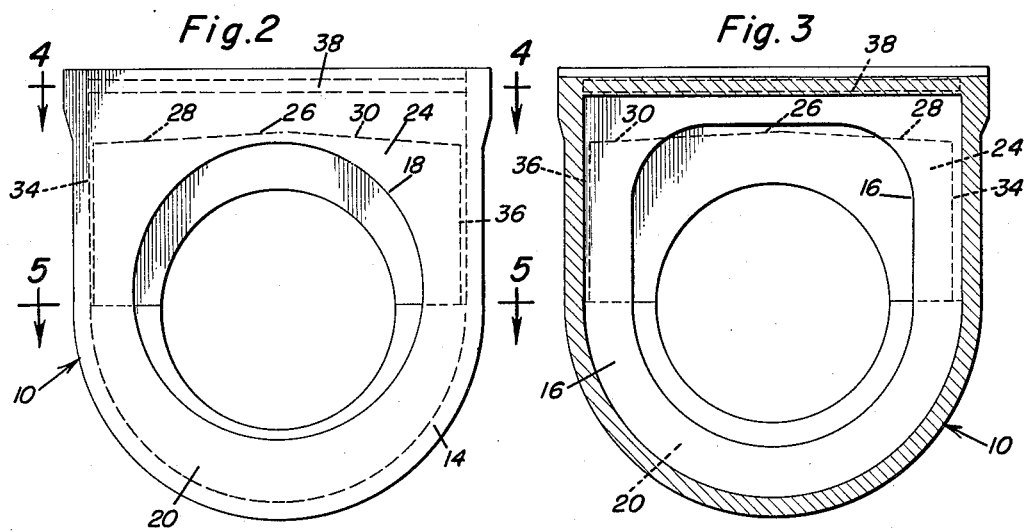
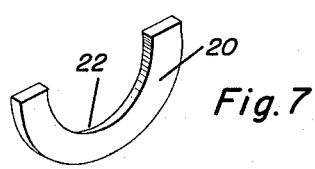
George C. Cook
INVENTOR.

United States Patent Office 2,734,759
Patented Feb. 14, 1956

2,734,759
COMBINATION OIL RETAINER AND DUST GUARD

George C. Cook, Martins Ferry, Ohio

Application September 8, 1953, Serial No. 379,006

1 Claim. (Cl. 286—6)

This invention relates to improvements in sealing devices particularly adapted for use in journal boxes so as to reduce oil and grease loss while preventing dust from entrance into the journal box.

The primary object of this invention resides in the provision of a combination oil retainer and dust guard that is strong and durable, being composed from materials which will insure a longer life, which are formed in a plurality of parts for ready replacement, and which utilizes a resilient strip of foam rubber or like material together with a plastic filling of asphalt cement or the like to seal the upper end of the space between the abutment walls of the journal box so as to form a highly effective seal.

Utilized in the present invention is a freely floating upper seal member which is adapted to ride on the upper portion of the axle extending through the journal box and which freely floating member may rise and fall with the action of the axle, the upper edge of the upper seal member being configurated for resilient engagement with the sealing strip of foam rubber as may be necessary due to the action of the axle.

These, together with the various ancillary objects and features of the invention which will become apparent as the following description proceeds, are attained by this combination oil retainer and dust guard, a preferred embodiment of which has been illustrated in the accompanying drawings, by way of example only, wherein:

Figure 1 is an elevational view of a journal box with parts being broken away to show the elements of the invention in greatest detail;

Figure 2 is an end elevational view of the journal box with the combination oil seal and dust guard operatively installed therein;

Figure 3 is a vertical sectional view as taken along the plane of line 3—3 in Figure 1;

Figure 4 is a vertical sectional view as taken along the plane of line 4—4 in Figure 2 and illustrating the construction of the resilient seal used at the upper portion of the space between the abutment walls of the journal box;

Figure 5 is a vertical sectional view as taken along the plane of line 5—5 in Figure 2 and illustrating the construction of the lower seal member;

Figure 6 is a perspective detail view of the upper seal member;

Figure 7 is a perspective detail view of the lower seal member.

With continuing reference to the accompanying drawings wherein like reference numerals designate similar parts throughout the various views, reference numeral 10 generally designates a journal box of conventional construction provided with abutment walls as at 12 and 14 each provided with apertures 16 and 18 respectively through which a shaft can readily pass. The side walls and bottom of the journal box 10 seal the space between the abutment walls 12 and 14 to form a cavity open at the top only.

The combination oil retainer and dust guard is composed of a lower seal member 20 preferably formed from an oil and heat resistant rubber or an oil and heat resistant felt or the like. The lower seal member 20 is semi-circular in shape and has a concavity 22 therein for snugly embracing the lower portion of a shaft or axle extending through the journal box 10. The lower seal member 20 fits snugly within the space between the abutment walls 12 and 14. An upper substantially freely floating seal member 24 is mounted for movement corresponding to the movement of an axle or shaft extending through the journal box 10. This upper seal member 24 is of the configuration as best seen in Figure 6 and is provided with an upper edge portion having an apex 26 and downwardly diverging sloping edge portions 28 and 30. The upper seal member 24 is likewise provided with a concavity for embracing an axle extending into the journal box 10. The side edge portions 34 and 36 are spaced from the side walls of the concavity between the abutment walls 12 and 14.

The space between the upper portions of the abutment walls 12 and 14 is sealed by a resilient strip of material such as foam rubber and indicated by reference numeral 38. This strip is compressed and seated between the abutment walls 12 and 14 leaving space for a plastic seal 40 of such material as asphalt cement or the like which prevents the intrusion of dirt or other foreign matter. It is to be noted that one of the features of the invention is that when the upper seal member 24 is displaced upwardly it will engage the resilient seal member 38 and be returned gently downwardly without the striking contact usually deleterious to the members of other types of dust guards. Further, it is to be noted that the upper seal member 24 is provided with the sloping upper edge portions 28 and 30 to prevent excessive wear at the ends of the seal 38.

Since from the foregoing the construction and advantages of this combination oil retainer and dust guard are readily apparent, further description is believed to be unnecessary.

However, since numerous modifications will readily occur to those skilled in the art after a consideration of the foregoing specification and accompanying drawings, it is not intended to limit the invention to a precise embodiment shown and described, but all suitable modifications and equivalents may be readily resorted to.

What is claimed as new is as follows:

In combination with a journal box having a spaced pair of abutment walls with the sides and bottom of said journal box sealing the space between said walls, a combination oil retainer and dust guard for embracing an axle extending through said walls, said dust guard comprising a lower seal member snugly seated between said walls and positioned below and engaged by the axle, an upper seal member resting on and floatingly mounted above said axle, a resilient strip between said walls spaced from and above said axle a distance greater than the height of said upper seal member, and a seal of plastic material on the outer surface of said resilient strip, said resilient strip comprising a strip of foam rubber, said plastic material comprising asphalt cement, the upper edge of upper seal member having an apex at the center thereof and downwardly divergingly sloping edge portions, the apex of said upper seal member being adapted to engage said resilient strip on upward movement of said upper seal member.

References Cited in the file of this patent

UNITED STATES PATENTS

| | | |
|---|---|---|
| 251,565 | Foster | Dec. 27, 1881 |
| 368,281 | Dawson et al. | Aug. 16, 1887 |
| 571,666 | Holderness | Nov. 17, 1896 |
| 714,326 | Parks | Nov. 25, 1902 |
| 1,177,547 | Snyder et al. | Mar. 28, 1916 |
| 2,152,937 | Vigne et al. | Apr. 4, 1939 |
| 2,213,414 | Simpson | Sept. 3, 1940 |